(12) United States Patent
Malin et al.

(10) Patent No.: US 6,895,005 B1
(45) Date of Patent: May 17, 2005

(54) BUSINESS LOGIC SERVER FOR FACILITATING THE TRANSMISSION OF A DATA DOWNLOAD TO A MOBILE WIRELESS UNIT

(75) Inventors: Anne Malin, Shawnee, KS (US); Neal Murphy, Leawood, KS (US); Tony Ho, Overland Park, KS (US); Barry Grant, Olathe, KS (US); Carl L. Finlayson, Piscataway, NJ (US); Jasper Howe, Overland Park, KS (US); Srivatsan Varadharajan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 747 days.

(21) Appl. No.: 09/840,340

(22) Filed: Apr. 23, 2001

(51) Int. Cl.[7] .............................................. H04L 12/28
(52) U.S. Cl. ....................... 370/389; 370/401; 455/419
(58) Field of Search ................................ 370/328, 338, 370/389, 401, 465, 473, 252, 254, 351, 352; 455/418–420, 432.1, 432, 433

(56) References Cited

U.S. PATENT DOCUMENTS

| | | | |
|---|---|---|---|
| 5,857,201 A | | 1/1999 | Wright, Jr. et al. |
| 5,950,130 A | * | 9/1999 | Coursey .................. 455/432.1 |
| 6,047,071 A | * | 4/2000 | Shah .......................... 380/273 |
| 6,070,184 A | | 5/2000 | Blount et al. |
| 6,144,849 A | * | 11/2000 | Nodoushani et al. ........ 455/419 |
| 6,195,546 B1 | * | 2/2001 | Leung et al. ................ 455/419 |
| 6,549,770 B1 | * | 4/2003 | Marran ........................ 455/419 |

OTHER PUBLICATIONS

Gellens, Wireless Device Configuration (OTASP/OTAPA) via ACAP, RFC 2636, pp. 1–32, 1999.*

Office Action from U.S. Patent Application No. 09/845,421, dated Sep. 8, 2004.

U.S. Patent Application nO. 09/845,421, filed on Apr. 30, 2001, entitled System and Method for Downloading Information to a Mobile Wireless Unit.

* cited by examiner

*Primary Examiner*—Frank Duong

(57) ABSTRACT

A business logic server for forming priority data structures includes a memory and a processing module. The processing module communicatively coupled to the memory. The processing module receives at least one transmission rule and a data download and stores the at least one transmission rule and the data download in the memory. The processing module is programmed to format the at least one transmission rule into at least one priority data structure and stores the priority data structure in the memory. The processing module is programmed to create an input file in the memory and format the data download into the input file. The processing module transmits the input file and the at least one priority data structure from the memory to a network logic server.

18 Claims, 12 Drawing Sheets

| Priority | Total number off-peak attempts | Total number of peak attempts |
|---|---|---|
| 01 | 3 | 3 |
| 02 | 3 | 2 |
| 10 | 2 | 1 |
| ... | ... | ... |
| 99 | 0 | 0 |

| Day of week 434 | Off-peak start time 436 | Off-peak end-time 438 |
|---|---|---|
| Monday 440 | 1:30AM | 3:00AM |
| Tuesday 442 | 1:30AM | 3:00AM |
| Wednesday 444 | 12:01AM | 4:00AM |
| Thursday 446 | 12:01AM | 4:00AM |
| Friday 448 | 2:01AM | 3:35AM |
| Saturday 450 | 1:59AM | 3:35AM |
| Sunday 452 | 1:00AM | 3:00AM |

| Priority | Resource Allocation Percentage |
|---|---|
| 1 | 50 |
| 2 | 20 |
| 3 | 15 |
| 4 - 10 | 10 |
| 11 - 98 | 5 |
| 99 | 0 |

FIG. 4C

BUSINESS LOGIC SERVER FOR FACILITATING THE TRANSMISSION OF A DATA DOWNLOAD TO A MOBILE WIRELESS UNIT

BACKGROUND OF THE INVENTION

1. Field of the Invention

The present invention relates to scheduling and transmitting data downloads from a database to a mobile wireless unit. Specifically, one aspect of the invention relates to over-the-air parameter administration (OTAPA).

2. Description of Related Art

Mobile wireless units have become widely used in society today. Illustratively, mobile wireless units may include cellular telephones, pagers, personal digital assistants (PDAs), or PCS handsets. Of course, other examples of mobile wireless units are possible.

The mobile wireless unit may be coupled to a wireless network and the mobile wireless unit may move ("roam") between wireless networks. Illustratively, wireless networks may include CDMA cellular telephone networks or PCS networks. Of course, other types of networks utilizing different types of message transmission technologies are possible.

Wireless networks and mobile wireless units may use a number of different bands of frequencies to transmit and receive information. In one example, a cellular telephone and cellular telephone network may use two bands of frequencies centered around 800 MHz (the A and B bands). In another example, PCS devices and PCS networks may use six bands of frequencies centered around 1900 MHz (the A, B, C, D, E and F bands).

Ordinarily, before transmitting or receiving information, the mobile wireless unit must determine a frequency band to use. In order to facilitate finding this frequency band, the mobile wireless unit may contain a preferred roaming list (PRL). The PRL includes a list of frequency bands listed in order of preference. These bands are used by the mobile wireless unit when it attempts to locate and connect to a wireless network. For example, upon activation, the mobile wireless unit may look at the first choice on the list, determine whether the choice is available, and, if not, continue on down the list until a connection can be established. Of course, the mobile wireless unit may attempt to connect to a wireless network that is not included in the PRL. However, the mobile wireless unit may first attempt to connect to a system that is listed in the PRL before it attempts to connect to a system that is not listed in the PRL.

The PRL may also have other uses. For instance, when a mobile wireless unit travels from one city covered by one service provider to a different city covered by another service provider, the PRL may tell the mobile wireless unit how to locate a preferred service provider, such as on which frequency band, for example. The PRL may also contain other information, for example, how a wireless unit may initiate and locate Advanced Mobile Phone Service (AMPS) coverage.

The PRL may be stored in a memory in the mobile wireless unit. For example, the PRL may be stored in permanent memory in the mobile wireless unit. Although the PRL may often be contained in permanent memory, the PRL itself might not be static and may be regularly changed. For example, the PRL may be updated to include new bands and channels of a service provider that offers a monetary discount for services provided.

Updates to the PRL may be accomplished in several ways. In one method, the mobile wireless unit is manually re-programmed. For example, the mobile wireless unit may be taken to a service center, and a technician at the service center may replace the current PRL with a new PRL.

Updates may also be accomplished by using OTAPA. Using OTAPA, the parameters (e.g., a PRL) are forwarded to the mobile wireless unit, after the mobile wireless unit requests that the parameters be changed. For example, downloading of information may be made from a server to the mobile wireless device.

To accomplish PRL updates using OTAPA, subscriber interaction is required. In one example, the subscriber may press the "*" button on a mobile wireless unit, then the "2" button, and finally the "TALK" button, to initiate the downloading of parameters.

SUMMARY OF THE INVENTION

The present invention advantageously facilitates the transmission of a data download, for example a PRL, from a database to a mobile wireless unit, without the need for human intervention. Specifically, a business logic server is provided that formats and places a single transmission rule or multiple transmission rules ("transmission rules") into a single data structure or multiple data structures ("priority data structures"). The transmission rules, which may be entered by a human user in a textual format, specify the circumstances under which a data download may be transmitted to a mobile wireless unit by a network logic server. The transmission rules within the priority data structures allow a device, for example, a network logic server, to accomplish the transmission of the data download to the mobile wireless unit without the need for human intervention.

In one embodiment of the present invention, a business logic server receives transmission rules. The transmission rules may be received from a variety of sources, for example, from a human user at a user interface. The business logic server may receive the transmission rules, create priority data structures, and format the transmission rules into the priority data structures. The business logic server may then send the priority data structures to a network logic server.

The business logic server may also receive a data download from a database. The data download may be any type of information used by a mobile wireless unit for any purpose, for example, a PRL. The business logic server may create an input file, store the data download in the input file, and transmit the input file to the network logic server.

In another embodiment of the present invention, a business logic server may include a memory and a processing module. The processing module may be communicatively coupled to the memory.

The processing module may receive the transmission rules from a plurality of sources. For example, a human user may enter the transmission rules in a textual format using a graphical user interface (GUI).

The processing module may receive the transmission rules, create priority data structures in the memory, and format the transmission rules into the priority data structures. For instance, the processing module may construct a priority-mapping table.

The priority mapping table may include a priority ranking of data downloads, based upon how many attempts a network logic server has made to transmit the data download to a mobile wireless unit.

The processing module also may create an input file in the memory. The input file, for example, may include a header portion and a data portion. The processing module may format the data download into the data portion of the input file. The processing module may transmit the input file and the priority data structures from the memory to the network logic server.

These as well as other features and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 4A is a mapping table in accordance with an exemplary embodiment of the present invention;

FIG. 4B is an off-peak setting table in accordance with an exemplary embodiment of the present invention;

FIG. 4C is a resource allocation table in accordance with an exemplary embodiment of the present invention;

DETAILED DESCRIPTION OF THE EXEMPLARY EMBODIMENT

Exemplary Architecture

Figure 1:
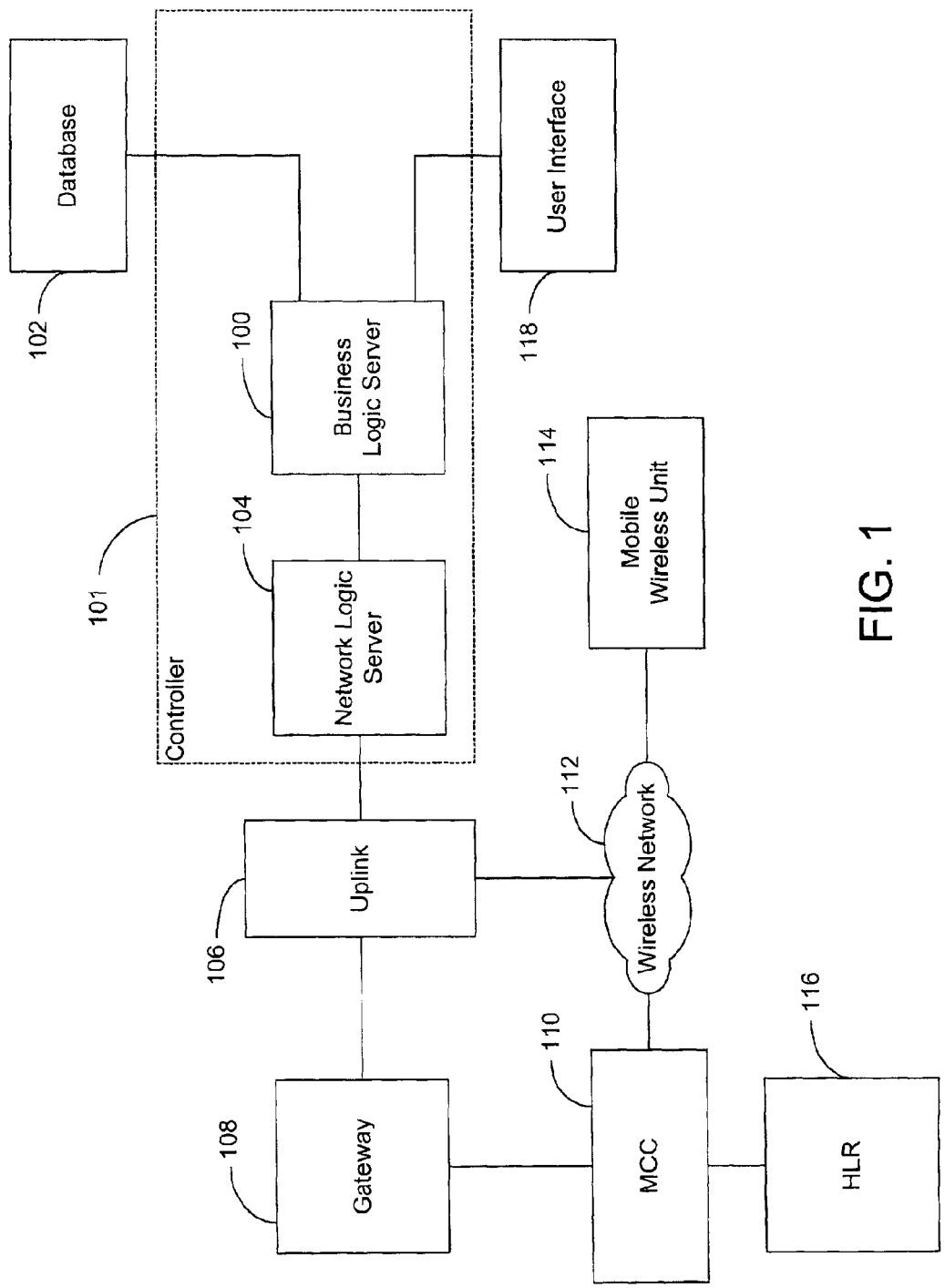
FIG. 1 is a block diagram of a system in accordance with an exemplary embodiment of the present invention.

Referring to the drawings, FIG. 1 provides a block diagram of a system for implementing an exemplary embodiment of the present invention. It should be understood that many of the elements described and illustrated throughout this specification are functional in nature and may be embodied in one or more physical entities or may take other forms beyond those described or depicted.

The system shown in FIG. 1 includes a controller 101, a database 102, an uplink module 106, a gateway 108, a message control center (MCC) 110, a wireless network 112, a mobile wireless unit 114, a home location register (HLR) 116, and a user interface 118. As further shown, the controller 101 comprises a business logic server 100 and a network logic server 104.

The interfaces connecting the various components of FIG. 1 may be wired or wireless. For example, the interface connecting the wireless network 112 and the mobile wireless unit 114 may be a wireless air interface.

Although the coupling between the various components of FIG. 1 is shown as being direct (i.e., no intermediate devices exist between components), the coupling between any of the components shown in FIG. 1 may also be indirect. In other words, intermediate devices may be also placed between any of the components of FIG. 1.

The interfaces between the various components may also conform to different protocols. For example, the interfaces between the HLR 116 and the MCC 110, the MCC 110 and the wireless network 112, and the MCC 110 and the gateway 108 may follow the signaling system 7 (SS7) protocol. In another example, the interfaces between the uplink module 106 and the gateway 108, the uplink module 106 and the network logic server 104, and the network logic server 104 and the business logic server 100 may follow the TCP/IP protocol. Of course, these interfaces may follow other protocols, as well.

Illustratively, the functions of the business logic server 100 may be implemented by a processor, which executes computer instructions stored in a memory. The business logic server 100 may create priority data structures, which indicate transmission rules for data to be transmitted ("data downloads") to the mobile wireless unit 114. The data downloads may include any type of data used by the mobile wireless unit 114 for any purpose. For instance, data downloads may include PRLs. In addition, the data downloads themselves may be structured in specific formats, such as input files, which are described elsewhere in this specification.

The transmission rules indicate the circumstances when the network logic server transmits data downloads to the mobile wireless unit. For example, the transmission rules may indicate the times when transmissions will occur. Other examples of transmission rules are possible and are described elsewhere in this specification. In addition, the transmission rules may be input to the business logic server 100 by a human user via the user interface 118. The transmission rules may be entered in a textual format using any data entry method or apparatus, for example, using a computer keyboard. Other types of data entry methods using other formats are possible.

The functions of the network logic server 104 may also be implemented by a processor, which executes computer instructions stored in memory. The network logic server 104 receives the priority data structures (indicating the transmission rules), which are supplied by the business logic server 100. The network logic server 104 schedule data downloads to the mobile wireless unit 114 according to these transmission rules. After an attempt to transmit the data download to the mobile wireless unit 114 has been made, the network logic server 104 may receive reports of the success or failure of the downloads from the mobile wireless unit 114.

The uplink module 106 may be manufactured by Openwave Systems Inc., for example. Upon receiving a data download from the network logic server 104, the uplink module 106 may generate control messages and transmit the control messages to the gateway 108. In one example of a control message, a network OTAPA alert (following the WAP protocol) may be transmitted from the uplink module 106 to the gateway 108.

The gateway may be a Bulk Messaging Gateway (BMG), or Short Message Service Center (SMSC), for instance. The gateway 108 may receive the control messages from the uplink module 106 and pass the control messages to the MCC 110. The gateway 108 may also re-format the control messages. For example, the gateway 108 may change the messages from having the TCP/IP protocol to the SS7 protocol.

Illustratively, the MCC may be a short message control center (SMCC) and transmit and receive messages according to the short message control protocol. Specifically, the MCC 110 may process control messages received from the gateway 108. The MCC 110 may also determine the location and status of the mobile wireless unit 114. For instance, the MCC 110 may query the HLR 116 for the location and status of the mobile wireless unit 114. The MCC, after determining the location and the status of the mobile wireless unit 114, may forward the control messages to the mobile wireless unit 114 via the wireless network 112.

The wireless network 112 may be any type of wireless network. For example, the wireless network may be a cellular telephone network. Of course, other types of networks are possible. The wireless network 112 may include a plurality of mobile switching centers (MSCs), a plurality of base stations, a plurality of interworking functions (IWF), and other entities.

Illustratively, the mobile wireless unit 114 may be a cellular telephone, pager, personal digital assistant (PDAs), or PCS handset. However, the mobile wireless unit may take other forms, as well.

Illustratively, the HLR may be manufactured by Lucent Technologies, Inc., for example. The HLR 116 maintains information indicating the location and status of the mobile wireless unit 114. The mobile wireless unit may be provisioned by the HLR 116 in order to receive data downloads from the network logic server 104. For example, a service provider may establish records in the HLR relating to a particular mobile wireless unit. The records may indicate that the mobile wireless unit is allowed to receive data downloads.

Figure 2:
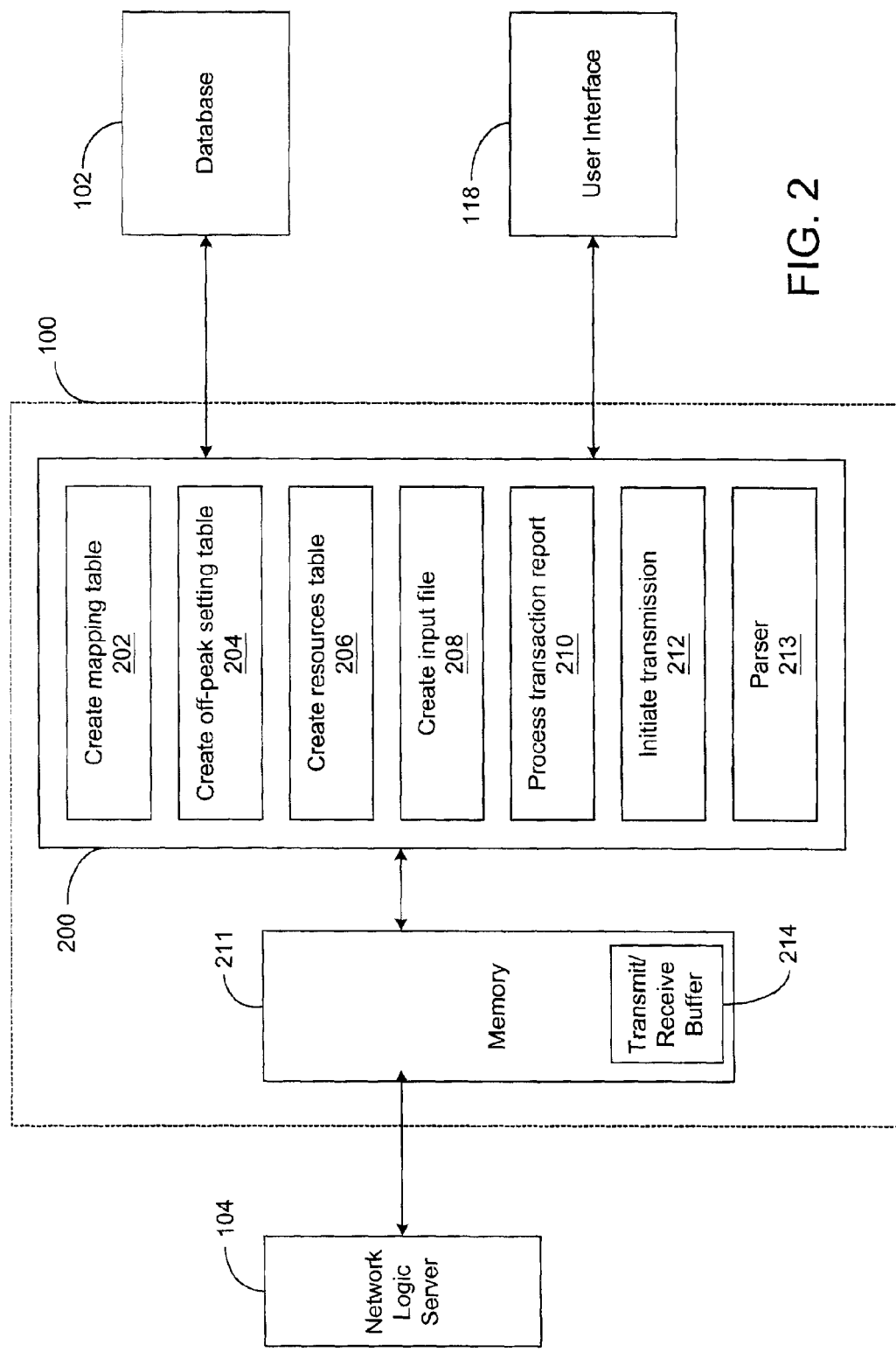
FIG. 2 is a block diagram of a business logic server in accordance with an exemplary embodiment of the present invention.

Referring now to FIG. 2, one illustrative embodiment of the business logic server 100 includes a processing module 200, a memory 211. The memory may include a transmit/receive buffer 212. The processing module 200 is communicatively coupled to the database 102 and the user interface 108. The memory 211 is communicatively coupled to the processing module 200.

The processing module 200 may include a create mapping table module 202, a create off-peak setting table module 204, a create resource allocation table module 206, a create input file module 208, a process transaction report module 210, an initiate transaction module 212, and a parser 213. The functions of the processing module 200 (including the functions of modules 202, 204, 206, 208, 210, 212, and 213) may be performed by a processor executing an appropriate set of instructions stored in the memory 211.

The parser 213 may receive and act upon transmission rules (in a textual format) from the user interface 118. The parser 213 may be a Openwave MMS/OTAPA server manufactured by Openwave Systems Inc., for example. The parser may receive text and split the text into components, which may be recognized by the other components of the processing module 200.

The create mapping table module 202 may also receive and act upon the parsed transmission rules from the parser 213. The transmission rules may indicate priorities for data downloads, for example. Upon receiving the transmission rules, the create mapping table module 202 may create a priority mapping table in the memory 211, populate the table with the transmission rules (e.g., priorities), store the table in the database 102, and send the table to the network logic server 104 via the transmit/receive buffer 214.

The create off-peak setting table module 204 may also receive and act upon the parsed transmission rules received from the parser 213. For example, the create off-peak setting table module 204 may receive a list of starting and ending times for data transmissions from the parser 213. The create off-peak setting table module 204 may create the off-peak setting table in the memory 211, place the transmission rules into the table, store the table in database 102, and send the table to the network logic server 104 via the transmit/receive buffer 214.

The create resource allocation table module 206 may also receive and act upon the parsed transmission rules received from the parser 213. For example, the create resources allocation table module 206 may receive a list of priorities and associated resource allocations relating to these priorities from the parser 213. The create resource allocation table module 206 may create the resource allocation table in memory 211, insert the transmission rules into the table, store the table in the database 102, and send the table to the network logic server 104 via the transmit/receive buffer 214.

The create input file module 208 may create an input file in the memory 211. The data used to populate the input file may be entered by a human user via the user interface 118 and/or obtained from the database 102. The input file may include a data download (e.g., a PRL), and the identity of the mobile wireless unit (e.g., by using the mobile's MIN). The create input file module 208 may then send the input file to the network logic server 104 via the transmit/receive buffer 214.

The process transaction report module 210 may receive transaction reports from the network logic server 104 via the transmit/receive buffer 214. A transaction report may include a result, for example, a result code, which indicates the data download was successful. The process transaction report module 210 may take the result code from the transaction report, create a log file (in the memory 211), insert the result code into the log file, and store the log file in the database 102.

The initiate transmission module 212 may instruct the create input file module 208 to assemble an input file and transmit the input file to the network logic server 104. For example, the initiate transmission module 212 may receive instructions from a user (via the interface 108) to initiate a download. Alternatively, the initiate transmission module 212 may assemble input files periodically and automatically.

The transmit/receive buffer 214 may store information received from the network logic server 104 (e.g., transmission reports) for forwarding to the processing module 200. The transmit/receive buffer 214 may also receive information from the processing module 200 (e.g., input files) and forward the information to the network logic server 104 when instructed to do so by the processing module 200.

Figure 3:
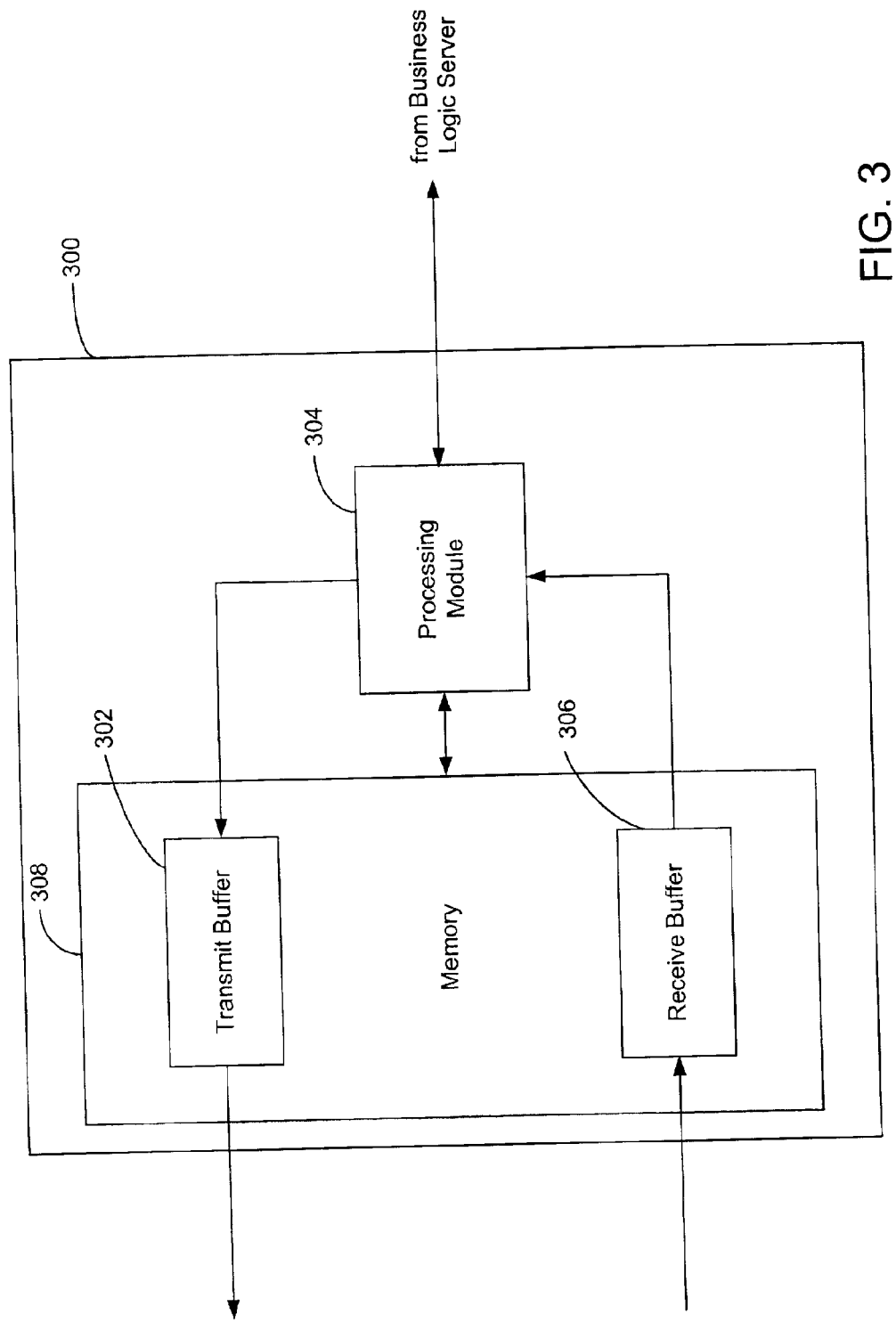
FIG. 3 is a block diagram of a network logic server in accordance with an exemplary embodiment of the present invention.

Referring now to FIG. 3, a network logic server 300 includes a processing module 304 and a memory 308. The memory 308 includes a transmit buffer 302 and a receive buffer 306.

The functions of the processing module 304 may be performed by a processor executing an appropriate set of instructions stored in the memory 308. The processing module 304 may receive data structures indicating the transmission rules (e.g., the priority mapping table, off-peak table, and resource allocation table), and schedule the transmission of the data (e.g., the data in the input file) according to the rules in the data structures. The processing module 304 may place the input file into the transmit buffer 302 in order of priority, and instruct the transmit buffer 302 to transmit the input file to the uplink module, in accordance with the transmission rules. The processing module 304 may store a copy of the input file, for other purposes, for example, retransmission, in the memory 308.

The memory 308 may be any type of memory used to store information. In addition to storing input files, the memory 308 may store computer instructions used to operate the processing module 304.

The receive buffer 306 may receive result messages. The result messages, which may, for example, include codes, preferably indicate if the attempted transmission has been successful or unsuccessful. If the transmission of the data download to the mobile wireless unit is unsuccessful, the result messages may indicate the reason for the failure. The processor 304 may then form a transaction report in the memory 308, which includes the result message.

Referring now to FIG. 4A, one illustrative example of a priority-mapping table includes a priority column 420, an off-peak attempts column 422, and a total number of peak attempts column 424. The table also includes a first row 426, second row 428, and an nth row 432.

Each row of the table defines a transmission rule. For example, the first row 426 assigns priority 1 (the highest priority) to data downloads (e.g., input files) where there have been three attempts at downloading in off-peak hours and three attempts made during peak hours. In another example, the second row 428 assigns priority 2 to data downloads where there have been three attempts at downloading in off-peak hours and two attempts to download made during peak hours. The third row 430 assigns priority 10 to data downloads where there have been two attempts at downloading in off-peak hours and one attempt to download made during peak hours. The nth row 432 assigns priority 99 to data downloads where there have been no attempts at downloading in off-peak hours and no attempts to download made during peak hours.

Referring now to FIG. 4B, one illustrative embodiment of an off-peak setting table includes a day-of-week column 434, an off-peak start column 436, and an off-peak end-time column 438. The table has seven rows 440, 442, 444, 446, 448, 450, and 452. Each of the rows is a transmission rule and corresponds to a day of the week having a specified off-peak starting time and an off-peak ending time (for conducting data downloads). For example, the first row 440 indicates that, on Mondays, data downloads will occur between 1:30 am and 3:00 am.

Referring now to FIG. 4C, one illustrative embodiment of a resource allocation table includes a priority column 454 and a resource allocation percentage column 456. The table also includes a first row 460, a second row 462, a third row 464, a fourth row 466, a fifth row 468, and a sixth row 470. Each row is a transmission rule and assigns resource allocation percentages to data downloads having a certain priority. For example, the first row 460 assigns data downloads with priority 1, fifty percent of resources. The !μl second row 462 assigns data downloads having priority 2, twenty percent of processor resources. The third row 464 assigns data downloads having priority 3, fifteen percent of processor resources. The fourth row 466 assigns data downloads having priorities 4–10, ten percent of processor resources. The fifth row 468 assigns data downloads with priorities 11–98, five percent of processor resources. Finally, the sixth row 470 assigns data downloads with priority 99, zero percent of processor resources. Resources may include the processing time, for example, of the processors in the business logic server and the network logic server.

Figure 4D:
FIG. 4D is an input file in accordance with an exemplary embodiment of the present invention.

Referring now to FIG. 4D, one illustrative embodiment of an input file includes a header field 472, a mobile identifier field 474, an other identifier field 476, an opcode field 478, a data download field 480, a priority field 482, and a footer field 484.

The header field 472 includes information typically found in headers, for example, the name of the input file. The mobile identifier field 474 includes the MIN number of the mobile wireless unit. The other identifier field 476 includes other information, which may identify the mobile wireless unit, for example, the mobile directory number (MDN), the electronic serial number (ESN), and the mobile subsidy lock (MSL).

The opcode field 478 defines the operation to be performed by the network logic server on the input file. For example, the code may indicate that a PRL update is to take place. In another example, the MIN or ESN may be changed. The data download field 480 includes the data download. For example, the data download field 480 may include the PRL.

The priority field 482 indicates the priority assigned to the input file. The footer field 484 includes information typically found in a footer, for example, the number of rows in the input file excluding the header and the footer.

Figure 4E:
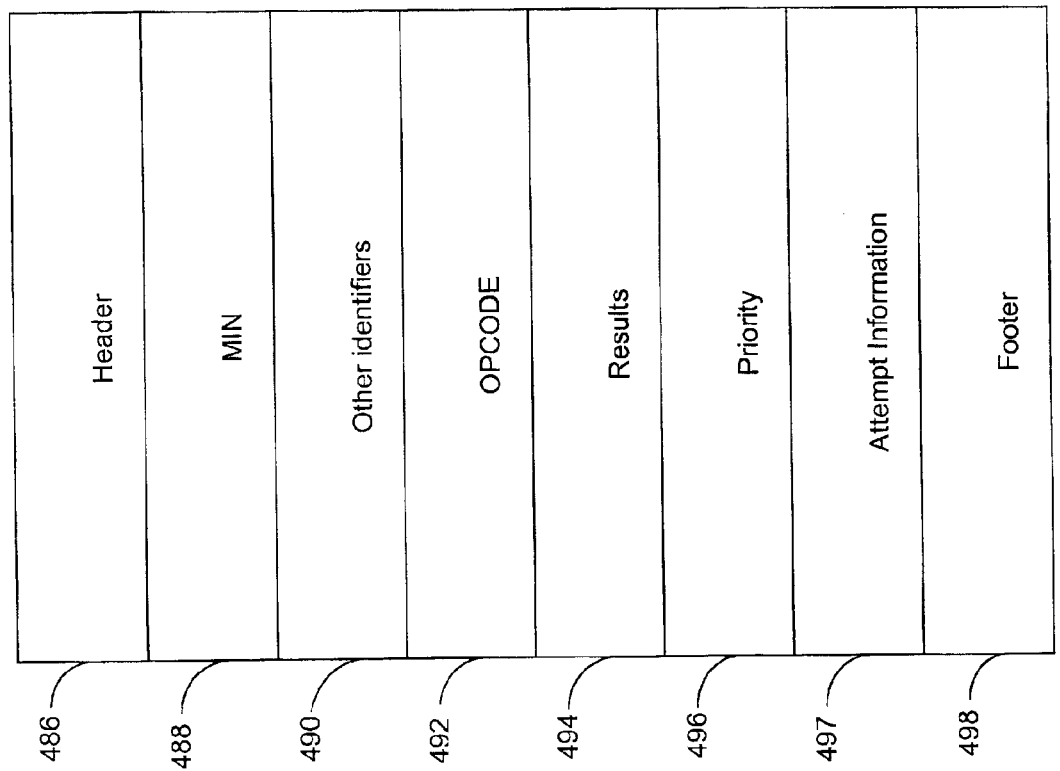
FIG. 4E is a transaction report in accordance with an exemplary embodiment of the present invention.

Referring now to FIG. 4E, one illustrative embodiment of a transaction report includes a header field 486, a mobile identifier field 488, an other identifier field 490, an opcode field 492, a results field 494, a priority field 496, an attempt information field 497, and a footer 498.

The header field 486 includes information typically found in headers, for example, the name of the input file. The mobile identifier field 488 includes the MIN number of the mobile wireless unit. The other identifier field 490 includes other information, which may identify the mobile wireless unit, for example, the mobile directory number (MDN), the electronic serial number (ESN), and the mobile subsidy lock (MSL).

The opcode field 492 defines the operation to be performed by the network logic server on the input file. For example, the code may indicate that a PRL update is to take place. In another example, the code may indicate that the MIN or ESN of the mobile wireless unit is to be changed.

The results field 494 contains the result code for the download. For example, the result code may indicate that the attempt was successful, the attempt was unsuccessful, and, if unsuccessful, the reasons why the attempt was unsuccessful.

The priority field 496 indicates the priority of the input file. The attempt information field 497 includes information concerning the attempted download, for example, the time the attempt was made, the attempt number (e.g., first attempt). The footer field 498 includes information typically found in a footer, for example, the number of rows in the input file excluding the header and the footer.

Exemplary Operation

In one illustrative example of the operation of the system illustrated in FIG. 1, the controller 101 schedules data downloads to the mobile wireless unit 114. The data downloads may be stored in the database 102.

The business logic server 100 (within the controller 101) receives transmission rules and places this information in priority data structures. The transmission rules may be entered by a human user at the user interface 118, for example. The priority data structures, for instance, tables, may be created in a memory within the business logic server 100.

The priority data structures containing the transmission rules may encompass a wide variety of formats. For example, they may include a priority-mapping table, an off-peak setting table, and a resource allocation table.

The business logic server 100 may send the priority data structures (e.g., the tables) to the network logic server 104 (within the controller 101). The network logic server 104 may then use the priority data structures to schedule the transmission of data downloads to the mobile wireless unit 114 via the uplink module 106. For example, the network logic server 104 may assign a priority to the data download using the priority-mapping table. Then, the network logic server may schedule the transmission of the data download according to the off-peak settings table and use the amount of resources indicated by the resource allocation table.

The uplink module 106, upon receipt of the data download, may generate control messages. The uplink module 106 may re-format the control messages and send the control messages to the MCC 110.

The MCC 110, upon receipt of the control messages, may use the HLR 116 to determine the location of the mobile wireless unit 114. Specifically, the MCC 110 may send a verification message to the mobile wireless unit 114 to determine the availability of the mobile wireless unit 114. The mobile wireless unit 114 may send a response message in reply to the verification message from the MCC 110, indicating whether the mobile wireless unit 114 is available. This response message may be forwarded to the uplink module 106 via the gateway 108. If the mobile wireless unit 114 is available, the data download may be transmitted from the uplink module 106 to the mobile wireless unit 114 via the wireless network 112.

The mobile wireless unit 114 may send the network logic server 104 updates indicating its availability and the success or failure of the transmission of the data download. The network logic server 104 may forward the updates to the business logic server 100.

The business logic server 100 may store the updates in a log. The log may be examined at the user interface 118 and/or stored in the database 112.

Figure 5:
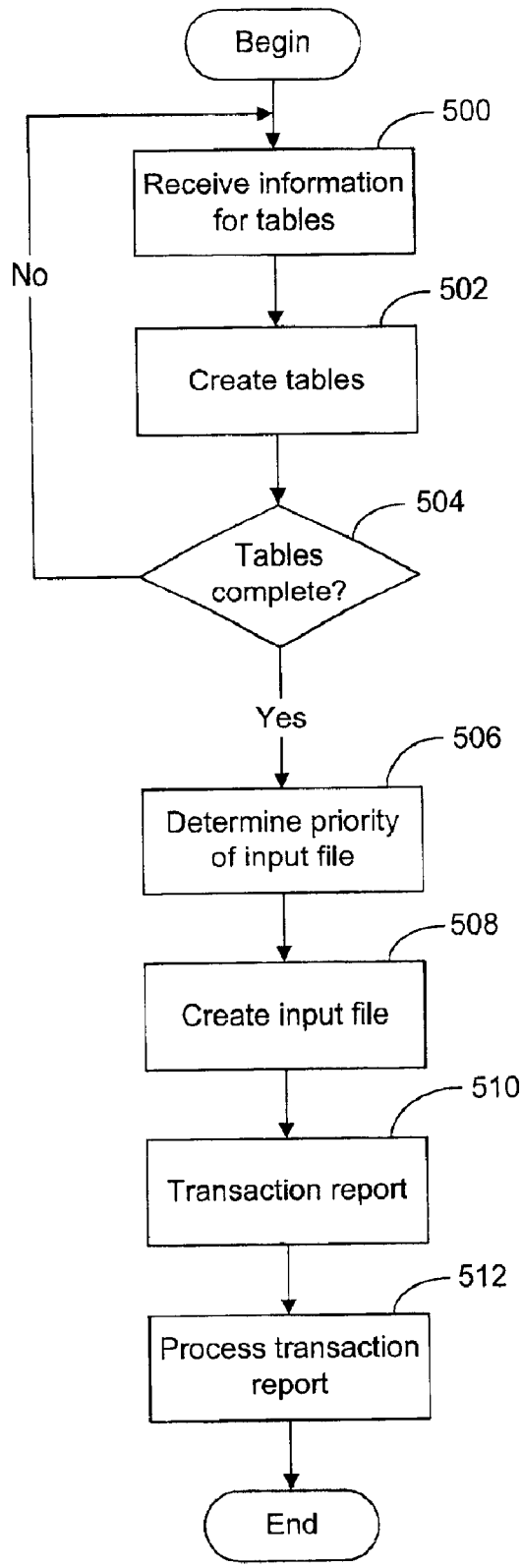
FIG. 5 is a flowchart illustrating the operation of a business logic server in accordance with an exemplary embodiment of the present invention.

Referring now to FIG. 5, one example of the operation of a business logic server is described. At step 500, the business logic server receives and parses the transmission rules to be placed in priority data structures. The transmission rules may be input manually by a user at a user interface (e.g., a GUI at a personal computer).

At step 502, the business logic server creates the priority data structures, which include the transmission rules. For example, the business logic server may create a priority-mapping table, an off-peak setting table, and a resource allocation table. Other examples of priority data structures are possible.

At step 504, the business logic server determines whether the priority data structures (e.g., the tables) are complete, for instance, whether all entries in the table are populated. If the answer is negative, then control returns to step 500 where the business logic server awaits further information. If the answer is affirmative, then control continues at step 506.

At step 506, the business logic server determines the priority for an input file. This may be done by using the priority-mapping table. For example, the business logic server may determine how many attempts have been made to transmit the data download, and then look to find the corresponding priority within the priority mapping table. At step 508, the business logic server creates an input file. The input file may include, for example, a header, the MIN of the mobile wireless unit, the data to download, and the priority determined at step 506.

At step 508, the business logic server receives a transaction report relating to the input file sent to the network logic server. The transaction report (from the network logic server) may, for instance, list the MINs involved, the attempts to transmit data downloads (by date), and result codes. At step 512, the transaction report is processed by the business logic server. For example, in one illustrative embodiment, the business logic server may extract any result codes present in the transaction report, convert the result codes to English-language text, and insert the text into a log file. In addition, a retry schedule may be maintained by the business logic server. The retry schedule determines when a new retry will be attempted. Execution then ends.

Figure 6:
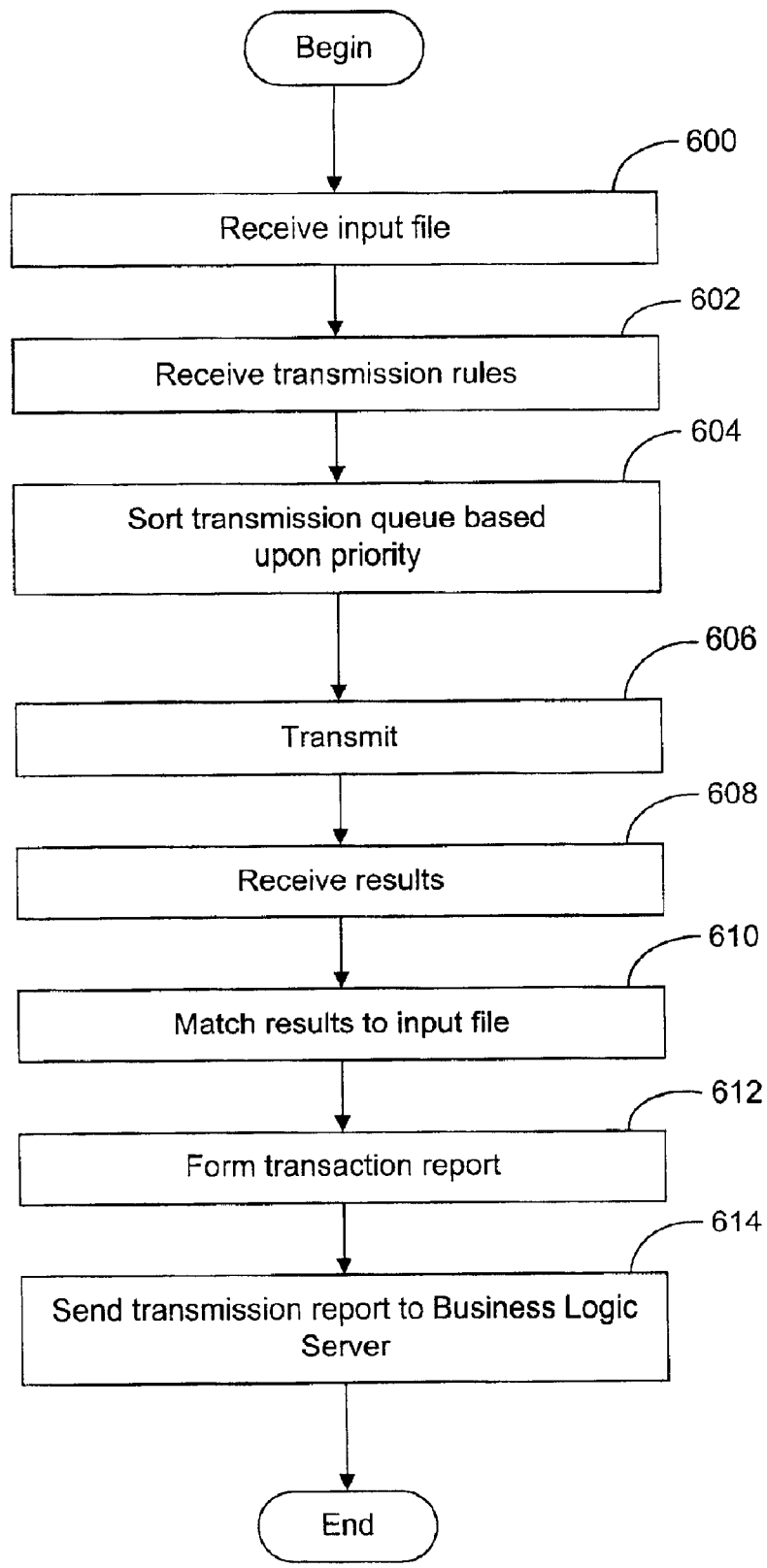
FIG. 6 is a flowchart illustrating the operation of a network logic server in accordance with an exemplary embodiment of the present invention.

Referring now to FIG. 6, one example of the operation of a network logic server is described. The network logic server includes a transmit buffer. At step 600, the network logic server receives an input file from the business logic server. At step 602, the network logic server receives the priority data structures, which indicate the transmission rules. For example, these data structures may be in the form of a priority mapping table, off-peak settings table, and/or resource allocation table. At step 604, the network logic server places the input file into its transmit buffer and sorts the buffer based on priority. At step 606, the network logic server transmits the input file from its transmit buffer according to the transmission rules.

At step 608, the network logic server waits to receive result messages, indicating the outcome of the download of the input file. At step 610, the network logic server matches the result messages to the input file that generated the result messages. At step 612, the network logic server forms a transaction report including the information indicated in the results message. At step 614, the transaction report is sent to the business logic server.

Figure 7:
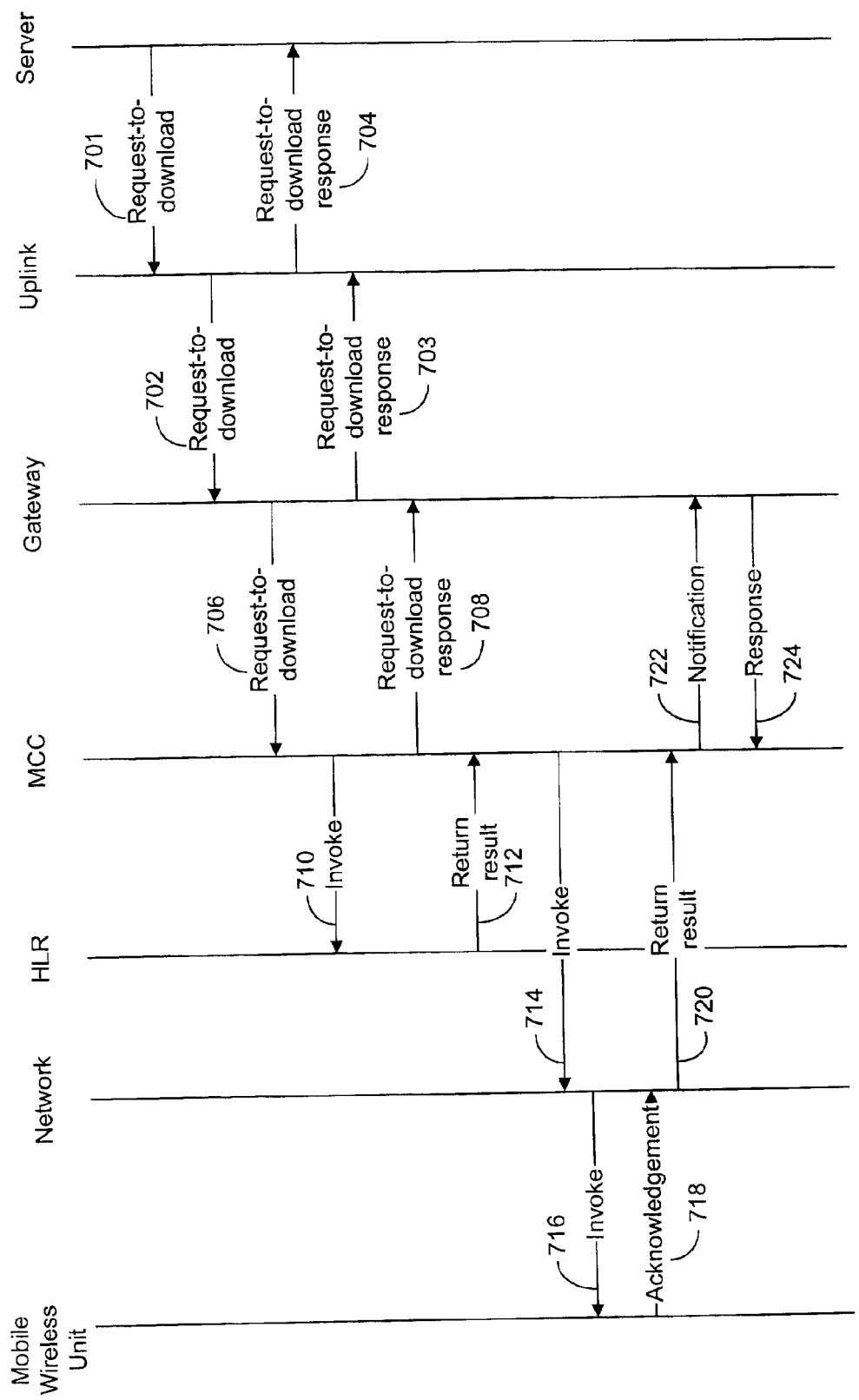
FIG. 7 is a call-flow diagram illustrating the operation of a system in accordance with an exemplary embodiment of the present invention.

Referring now to FIG. 7, one example of the operation of the network of the present invention is described.

At step 701, a request-to-download message, for instance, a submit_sm message according to the IS_637 protocol, is transmitted from the uplink module to the gateway. The uplink module generates the request-to-download message upon receipt of a data download, for instance, an input file. At step 702, the request-to-download messages are sent from the uplink module to the gateway.

At step 703, the gateway acknowledges that it has received the request-to-download message by returning an acknowledgement message, for example, a submit_sm_resp message according to the IS_637 protocol, to the uplink module. At step 706, the gateway formats and sends the request-to download message to the MCC, which delivers the message to the mobile wireless unit. At step 708, the MCC sends an acknowledgement message, for example a submit_sm_resp message according to the IS_637 protocol, to the gateway. The acknowledgement message verifies receipt of the request-to-download message and indicates that the request-to-download message is in a proper format. If the request-to-download message was incorrectly formatted, the acknowledgement message may contain an error status, and delivery from the MCC to the mobile wireless unit of the request-to-download message would not occur.

At step 710, the MCC sends an invoke message, for example, an IS_41 SMSREQ invoke message, to the HLR serving the mobile wireless unit. At step 712, the HLR responds with a return result message, for example, an IS_41 SMSREQ response message, which includes the address, for example the SMS address, of the mobile wireless unit.

At step 714, the MCC sends an invoke message, for instance, an IS_41 SMDPP invoke message, to the wireless network, for example, to the serving MSC, using the address returned in step 708. The invoke message may contain the alert message in a format recognizable by the wireless network, for example, as an IS_637 CMT message.

The wireless network includes a plurality of MSCs. A selected one of these MSCs (the serving MSC) serves the mobile wireless unit. At step 716, the network, for example, the serving MSC within the network, validates the invoke message received from the MCC and builds and sends a short invoke message to the mobile wireless unit. The short invoke message contains, for example, an alert message (in a textual format) and, in one example, may be formatted as an IS_637 CMT message.

At step 718, the mobile wireless unit, upon receipt of the short invoke message containing the text message, transmits an acknowledgement message to the wireless network, for example, to the serving MSC within the wireless network, indicating successful delivery of the short invoke message.

At step 720, the wireless network, for example, the serving MSC within the wireless network, returns a return result message to the MCC, for example, an IS_41 SMDPP return result message, which indicates the successful delivery of the short invoke message to the mobile wireless unit. Alternatively, if the delivery was unsuccessful, the return result message may indicate an unsuccessful delivery and the reason for the unsuccessful delivery.

At step 722, the MCC builds and sends a notification message, for example, a deliver_SM message according to the IS_637 protocol, to the gateway to indicate the short invoke message reached the mobile wireless unit. At step 724, the gateway acknowledges receipt of the notification message by sending a response message, for example, a deliver sm resp command according to the SMSC protocol. After the completion of step 724, the uplink module may transmit the data download, for instance, the input file, to the mobile wireless unit via the wireless network.

Figure 8:
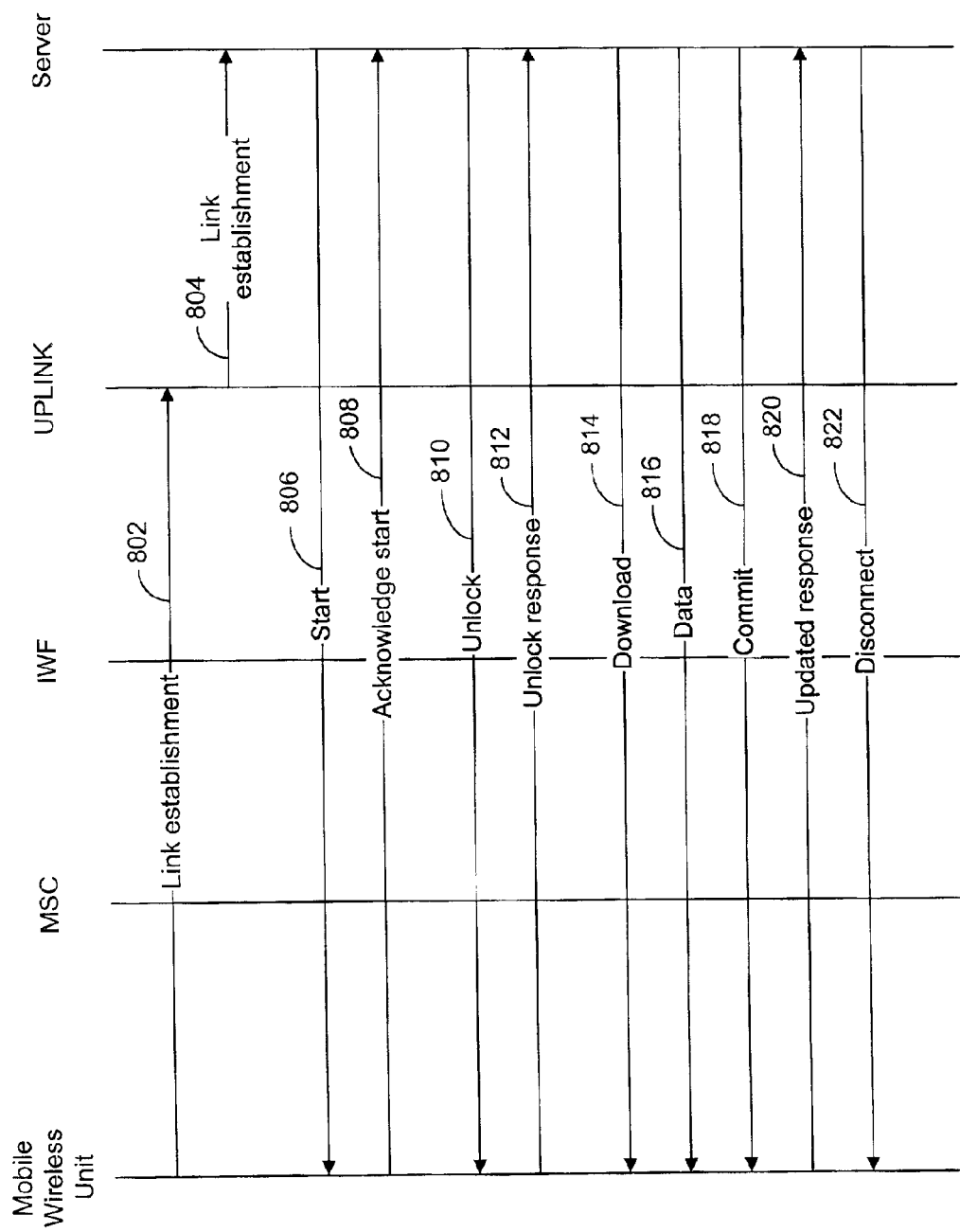
FIG. 8 is a call-flow diagram illustrating the operation of a system in accordance with an exemplary embodiment of the present invention.

Referring now to FIG. 8, one example of the operation of the network of the present invention is illustrated. At step 802, the mobile wireless unit establishes a communication link with the uplink module. For example, a wsp_get command according to the WAP protocol may be sent from the mobile wireless unit to the uplink module via the wireless network.

At step 804, the uplink module receives the link establishment message from the mobile wireless unit, reformats the link establishment message, and forwards the reformatted link establishment message to the network logic server. The re-formatted message may take a variety of forms, for example, an OTAPA start message according to the IS_683A protocol.

At step 806, the network logic server issues a start command, for example, an OPTAPA start message according to the IS_683A protocol, to the mobile wireless unit via the uplink module. At step 808, the mobile wireless unit transmits an acknowledgement to the server, for example an OTAPA response message according to the J-STD-008 protocol, indicating that start command has been received.

At step 810, the network logic server sends an unlock command, for example the UNLOCK command according to the IS_683A protocol, to the mobile wireless unit via the uplink module. The unlock command is a security mechanism, which acts as a key to enable only authorized users (e.g., the network logic server) to access the mobile wireless unit. At step 812, the mobile wireless unit transmits a response to server, indicating that the unlock command has been received and that the mobile wireless unit is ready to receive a data download.

At step 814, the network logic server sends a download command, for example a download PRL command according to the IS_683A protocol, to the mobile wireless unit via the uplink module. This command informs the mobile wireless unit that a data download is about to occur.

At step 816, the mobile wireless unit receives the data download, for example, the PRL, from the server via the uplink module and the wireless network. The mobile wireless unit may store the data download in temporary memory.

At step 818, the network logic server sends a commit command to the mobile wireless unit via the uplink module. The commit command instructs the mobile wireless unit to make the changes proposed in the data download permanent. For example, if PRL changes have been downloaded, then the commit command asks the mobile wireless unit to replace its current PRL with the PRL that has just been downloaded at step 716.

At step 820, the mobile wireless unit sends an updated response to the network logic server. If, for any reason, the changes can not be made by the mobile wireless unit (e.g., the mobile wireless unit has no power), the updated response informs the network logic server.

At step 822, the network logic server sends a disconnect command to the mobile wireless unit via the uplink module. The connection between the network logic server and the mobile wireless unit is released.

As in most telecommunications applications, those skilled in the art will appreciate that many of the elements described herein are functional entities that may be implemented as discrete components, in any suitable combination and location. Further, various functions described herein as being performed by one or more entities may be carried out by a processor executing an appropriate set of machine language instructions stored in memory. Provided with the present disclosure, those skilled in the art can readily prepare appropriate computer instructions to perform such functions. It will also be understood, that changes and modifications to the exemplary embodiments of the present invention described herein may be made without deviating from the spirit and scope of the invention, as defined by the following claims.

We claim:

1. A business logic server for forming priority data structures, the business logic server comprising, in combination:

a memory;

a processing module communicatively coupled to the memory, wherein the processing module receives at least one transmission rule and a data download and stores the at least one transmission rule and the data download in the memory;

wherein the processing module is programmed to format the at least one transmission rule into at least one priority data structure and stores the priority data structure in the memory;

wherein the at least one priority data structure comprises a table selected from the group consisting of: (i) a priority mapping table, (ii) an off-peak setting table, and (iii) a resource allocation table;

wherein the processing module is programmed to create an input file in the memory and format the data download into the input file; and wherein the processing module transmits the input file and the at least one priority data structure from the memory to a network logic server.

2. The business logic server of claim 1, wherein the processing module receives a transaction report from the network logic server, and wherein the transaction report includes a result code, wherein the processing module extracts the code from the transaction report and stores the code in a log file.

3. The business logic server of claim 1, wherein the at least one priority data structure comprises a priority mapping table.

4. The business logic server of claim 1, wherein the at least one priority data structure comprises an off-peak setting table.

5. The business logic server of claim 1, wherein the at least one priority data structure comprises a resource allocation table.

6. The business logic server of claim 1, wherein the at least one priority data structure includes a priority mapping table, an off-peak setting table, and a resource allocation table.

7. The business logic server of claim 1, wherein the data download comprises a preferred roaming list (PRL).

8. A method of forming at least one priority data structure and an input file, the method comprising:

receiving at least one transmission rule;

establishing in a data storage medium at least one priority data structure that defines the at least one transmission rule;

receiving a data download;

establishing in a data storage medium an input file;

formatting the data download into the input file; and transmitting the input file and the at least one priority data structure to a network logic server, wherein the at least one priority data structure comprises a table selected from the group consisting of: (i) a priority mapping table, (ii) an off-peak setting table, and (iii) a resource allocation table.

9. The method of claim 8 further comprising:

receiving a transaction report from the network logic server;

examining the transaction report for a result code; and placing the result code in a log file.

10. The method of claim 8, wherein the at least one priority data structure includes a priority mapping table, an off-peak setting table, and a resource allocation table.

11. The method of claim 8, wherein the at least one priority data structure comprises a priority mapping table.

12. The method of claim 8, wherein the at least one priority data structure comprises an off-peak setting table.

13. The method of claim 8, wherein the at least one priority data structure comprises a resource allocation table.

14. A business logic server comprising, in combination:

means for receiving at least one transmission rule;

means for establishing in a data storage medium at least one priority data structure that defines the at least one transmission rule;

means for receiving a data download;

means for establishing in a data storage medium an input file;

means for formatting the data download into the input file; and means for transmitting the input file and the at least one priority data structure to a network logic server, wherein the at least one priority data structure comprises a table selected from the group consisting of: (i) a priority mapping table, (ii) an off-peak setting table, and (iii) a resource allocation table.

15. The business logic server of claim 14, wherein the at least one priority data structure comprises a priority mapping table.

16. The business logic server of claim 14, wherein the at least one priority data structure comprises an off-peak setting table.

17. The business logic server of claim 14, wherein the at least one priority data structure comprises a resource allocation table.

18. The business logic server of claim 14, wherein the at least one priority data structure includes a priority mapping table, an off-peak setting table, and a resource allocation table.

* * * * *